(12) United States Patent
Mak et al.

(10) Patent No.: US 12,169,313 B2
(45) Date of Patent: Dec. 17, 2024

(54) COMPACT MICRO BENCH FOR OPTICAL TRANSCEIVER SUB-ASSEMBLY

(71) Applicant: Cloud Light Technology Limited, Hong Kong (HK)

(72) Inventors: Wing Keung Mark Mak, Hong Kong (HK); Vincent Wai Hung, Hong Kong (HK); Hulmut Ying Wai Sun, Hong Kong (HK); Vivian Wei Ma, Hong Kong (HK); Yvonne Xiaoming Yu, Hong Kong (HK); Jason Hok Hay Tang, Hong Kong (HK); Kwong Shing Tsang, Hong Kong (HK); Hermit Ka Kit Wong, Hong Kong (HK)

(73) Assignee: Cloud Light Technology Limited, Hong Kong (HK)

( * ) Notice: Subject to any disclaimer, the term of this patent is extended or adjusted under 35 U.S.C. 154(b) by 169 days.

(21) Appl. No.: 17/952,360

(22) Filed: Sep. 26, 2022

(65) Prior Publication Data

US 2023/0236371 A1 Jul. 27, 2023

Related U.S. Application Data

(60) Provisional application No. 63/302,126, filed on Jan. 23, 2022.

(51) Int. Cl.
*G02B 6/42* (2006.01)
*H04B 10/40* (2013.01)

(52) U.S. Cl.
CPC ......... *G02B 6/4246* (2013.01); *G02B 6/4257* (2013.01); *G02B 6/4271* (2013.01); *G02B 6/4281* (2013.01); *H04B 10/40* (2013.01)

(58) Field of Classification Search
CPC ... G02B 6/4257; G02B 6/4271; G02B 6/4281
See application file for complete search history.

(56) References Cited

U.S. PATENT DOCUMENTS

| 2013/0250980 A1* | 9/2013 | Daiber ............. H01S 5/02325 372/20 |
| 2015/0104177 A1* | 4/2015 | Kato ................... H04B 10/40 398/79 |
| 2022/0011519 A1* | 1/2022 | Xie ..................... H01S 3/0064 |

* cited by examiner

*Primary Examiner* — Sung H Pak
(74) *Attorney, Agent, or Firm* — Harrity & Harrity, LLP (57) ABSTRACT

An optical transceiver sub-assembly (100) integrated with a silicon photonic platform having a folded optical path for transmitting and detecting a plurality of optical signals includes a housing chamber (105) and a top cover (110) to enclose elements of the optical transceiver sub-assembly (100) other than the housing chamber (105) and the top cover (110), a bottom housing module (115) accommodating an optical micro integration (130). In particular, the optical transceiver sub-assembly (100) is operably configured to establish an optical-electrical communication with an outside surrounding.

18 Claims, 10 Drawing Sheets

COMPACT MICRO BENCH FOR OPTICAL TRANSCEIVER SUB-ASSEMBLY

CROSS-REFERENCE TO RELATED APPLICATIONS

This application claims the benefit of U.S. Provisional Application No. 63/302,126 titled "Compact Micro Bench for Optical Transceiver Sub-Assembly" filed by the applicant on Jan. 23, 2022, which is incorporated herein by reference in its entirety.

FIELD OF THE INVENTION

Embodiments of the present invention relate to the field of optical subassemblies and more particularly to an optical sub assembly for transmitting and detecting optical signals.

BACKGROUND OF THE INVENTION

There are many advantages of transmitting light signal via optical fiber waveguides and the use thereof is diverse. Single or multiple fiber waveguides may be used simply for transmitting visible light to a remote location. Complex telephony and data communication systems may transmit multiple specific optical signals. The data communication systems involve devices that couple fibers in an end-to-end relationship, including optoelectronic or photonic devices that include optical and electronic components that source, detect and/or control light, converting between light signals and electrical signals, to achieve high speed and high-capacity data communication capabilities.

Data communication networks have a huge traffic increase now with a growth rate of 30% per year. Such large and rapid growth will be not sustainable from an economic and environmental point of view if using current technology. One breakthrough technology for dealing with this information explosion is high density photonic integration with ultra-small photonics devices.

Integration, being the last step to realize the whole functionality, plays an important role in the system. Monolithic integration has been achieved by using the standard complementary CMOS foundry and has been developed continuously in order to commercialize. Although monolithic integration has the advantages of more compact and low cost, there are always the challenges when implementing this technology in silicon photonics on monolithic silicon. The critical issue for this monolithic laser is it is difficult to efficiently couple light from the laser active region to the silicon photonic PIC. That is the reason that hybrid methods still occupy current silicon photonic system integration technology. Most complex functionalities and structures must be constructed by hybrid integration.

In the hybrid integration, both laser source and PIC are integrated independently on a specific platform, which acts as the holder to provide mechanical support to them. Electrical interconnection is also realized on the platform. Since both laser and PIC are sensitive to external stress and environmental temperature, the platform should not only provide a stable support but also prevent them from either mechanical or thermal disturbances externally. And it should be more robust to sustain the humidity and dust, which may affect the optical component lifetime and optical path obstacle, respectively.

As an active component with high thermal density, a laser tends to induce high temperatures affecting its own performance. New challenge is here to make the laser achieve thermal stability. Active cooling solution is usually implemented by adding a thermoelectric cooler (TEC). In a general photonic integrated circuits (PICs) package, including the PIC as the function executor and laser as the light source, proper thermal management during operation needs to be carefully designed to keep the system working properly.

A mechanical isolated system is preferred in order to prevent external disturbances. The system should have the capability to isolate the stress induced by outside mechanical interference, such as, bending, squeeze, shock and vibration. An independent system will provide the stable environment for laser and PIC to perform as their designed points without attenuation caused by outside distribution.

To achieve an active cooling system, TEC is normally attached under the platform with its cooling surface. The heat generated by laser or other active components can dissipate through the thermal path of the platform. Then the TEC brings the heat to its hot surface by electricity. TEC's efficiency is affected by its active area with peltier columns. Normally uniformly distributed peltier columns in an area with length and width aspect ratio near 1 will show good performance to those larger than 1, meaning an area more like a square is the preferred shape for achieving good heat dissipation performance. So, the square-like shape is also preferred for the platform supporting the PIC and laser together. In the integration of laser source and PIC, it is straightforward to align the laser source to the PIC in the same optical path as a straight line. But the length along the optical path will be the combination of both length of laser source and PIC, causing a longer dimension along the optical path, hence a supporting platform with larger aspect ratio. That is not expected since TEC with such a large aspect ratio only has its efficient active area near the center, the heat source far from the center will not be dissipated efficiently. So, a compact integration of laser and PIC is required, which brings a challenge for some types of lasers with longer dimension, such as external cavity laser.

Thus, a compact sub-assembly in the whole transceiver module with a hermetic environment is proposed to overcome the effects from humidity and dust and ensure product reliability.

SUMMARY OF THE INVENTION

Aspects of the disclosed embodiments seek to provide an optical transceiver sub-assembly applicable to light transceivers and a method for transmitting and detecting optical signals thereof. The optical transceiver sub-assembly for transmitting and detecting optical signals is integrated with a silicon photonic platform having a folded optical path. The optical transceiver sub-assembly includes a housing chamber with a top cover to enclose the optical transceiver sub-assembly with an optical micro integration having an optical micro bench, the light source, photonic integrated circuit (PIC), a carrier, a prism and a thermoelectric temperature controller (TEC). The optical micro bench is configured to deposit a photonic integrated circuit (PIC), a light source, a plurality of passive optical components and a printed circuit board (PCB). In particular, the prism folds light from the laser source in a reverse direction from original path, the carrier fixes the optical micro bench and supports the optical micro integration and the thermoelectric temperature controller (TEC) cools heating elements in the optical transceiver sub-assembly. Further, the thermal expansion coefficient of the optical micro bench is the same as the photonic integrated circuit (PIC).

In accordance with an embodiment of the present invention, the thermoelectric temperature controller (TEC) is deposited on the carrier. In particular, the cooling surface of the thermoelectric temperature controller (TEC) is placed towards the optical micro bench.

In accordance with an embodiment of the present invention, the light source is configured to emit an output light signal. In particular, the light source is a laser source. Moreover, the laser source is positioned at one side of the photonic integrated circuit (PIC). Further, the laser source emits light in a reverse direction from the photonic integrated circuit (PIC).

The photonic integrated circuit (PIC) manipulates the light beam to create optical signals and emit the optical signals to an output passive optical component such as a circulator and a polarizing beam splitter (PBS). The circulator distributes the received light beam to the "Rx" input of the photonic integrated circuit (PIC). Further, the polarizing beam splitter (PBS) allows light in one polarization (P) to pass unhindered while it reflects light.

The plurality of passive optical components may include but is not limited to a lens or a lens array.

The Flexible printed circuit board (PCB) establishes a signal connection between the inner printed circuit board (PCB) and the outer printed circuit board (PCB) positioned on the bottom housing module. Further, the inner printed circuit board (PCB) may accommodate a transimpedance amplifier and other electrical components to amplify the optical signals.

In accordance with an embodiment of the present invention, the optical micro bench may further include a Critical e-component and Flexible electrical connector.

In accordance with an embodiment of the present invention, the housing chamber includes the top housing module with the top cover to enclose the housing chamber with the optical transceiver sub-assembly, a bottom housing module at the bottom of the housing chamber, a transparent optical window to establish an electrical communication and an optical communication with outside and one or more fixing features at bottom of the bottom housing module to fix the optical transceiver sub-assembly to the bottom housing module.

In accordance with an embodiment of the present invention, the housing chamber and the top cover may have one or more slots at the electrical inlet and/or electrical outlet points. Particularly, the one or more slots are filled with epoxy to hermetically seal the optical transceiver sub-assembly.

In accordance with an embodiment of the present invention, the housing chamber is fixed to the bottom housing module by a hard fixing method. Further, the optical micro integration is fixed to the housing chamber by a soft epoxy and the carrier is fixed to the chamber at the bottom housing module by a soft fixing method.

The optical transceiver sub-assembly is configured to establish an optical-electrical communication with the outside. In particular, the electrical connection is made by a flexible printed circuit board (PCB) and the transparent optical window for the light beam.

Another embodiment of the present invention relates to a method for transmitting and detecting optical signals by an optical transceiver sub-assembly integrated with a silicon photonic platform having a folded optical path. The method comprising steps of positioning a laser source emitting light in a reverse direction aside of a photonic integrated circuit (PIC), folding of a light beam from the laser source in a reverse direction from original path by the prism, guiding the light beam folded by the prism and a plurality of passive optical components to an input of the photonic integrated circuit (PIC), manipulating the light beam by the photonic integrated circuit (PIC) to form a plurality of optical signals, emitting the plurality of optical signals to an output passive optical component, distributing the light beam received by the circulator to "Rx" input of photonic integrated circuit (PIC) and analyzing the plurality of optical signals by a transimpedance amplifier of an inner printed circuit board (PCB).

In accordance with an embodiment of the present invention, the method further comprises depositing a photonic integrated circuit (PIC), a light source, a plurality of passive optical components and a printed circuit board (PCB) on an optical micro bench, fixing the optical micro integration to the housing chamber using a soft epoxy and fixing the carrier to the chamber at the bottom housing module by a soft fixing method.

In accordance with an embodiment of the present invention, the method further comprises clamping a flexible PCB at an edge of the housing chamber and the top cover, filling one or more slots at electrical inlet and/or electrical outlet points on the housing chamber and the top cover with epoxy and curing one or more slots to form a hermetic sealing to seal the optical transceiver sub-assembly.

Additional aspects of the invention will be set forth in part in the description which follows, and in part will be obvious from the description, or may be learned by practice of the invention.

BRIEF DESCRIPTION OF THE DRAWINGS

So that the manner in which the above-recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

ELEMENT LIST

Optical transceiver sub-assembly—100
Housing chamber—105
Top cover—110
Bottom housing module—115
Transparent optical window—120
Plurality of mounting features—$125_{1-N}$
Optical micro integration—130
Optical micro bench—135
Electrical Connection slots—140
Prism—155
Photonic integrated circuit (PIC)—160
Light source—165
Plurality of passive optical components—170
Inner Printed circuit board (PCB)—175
Outer Printed circuit board (PCB)—177
Flexible Printed circuit board (PCB)—179
Lens—180
Carrier—185
Thermoelectric temperature controller (TEC)—190
Critical e-component—195

DETAILED DESCRIPTION

The present invention relates to a compact micro bench for optical transceiver sub-assembly. The principles of the present invention and their advantages are best understood by referring to FIG. 1A to FIG. 10. In the following detailed description of illustrative or exemplary embodiments of the disclosure, specific embodiments in which the disclosure may be practiced are described in sufficient detail to enable those skilled in the art to practice the disclosed embodiments.

The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

Terms fixing features and mounting features can be used interchangeably for convenience throughout the draft.

Term Electrical Connection slots can be used for electrical inlet or electrical outlet slots or epoxy slots interchangeably for convenience throughout the draft.

Figure 1A:
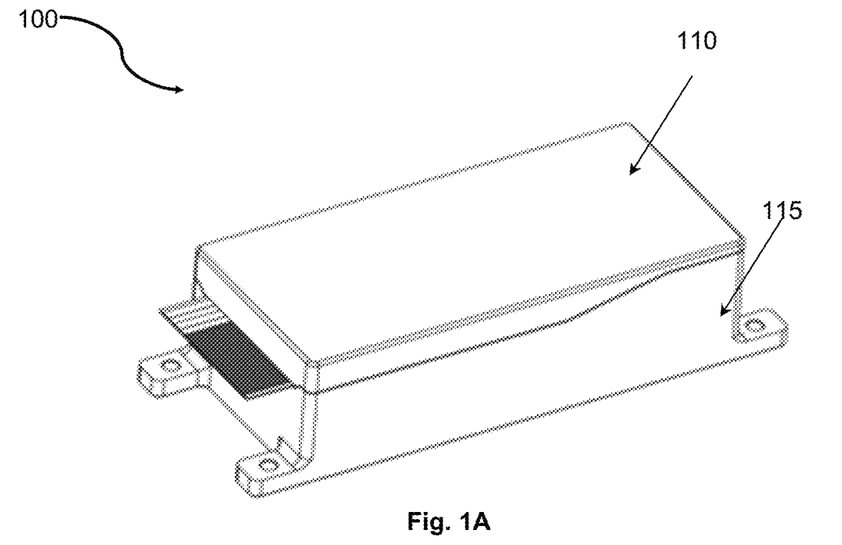
FIG. 1A is a pictorial snapshot illustrating an optical transceiver sub-assembly in accordance with an embodiment of the present invention.
Figure 1B:
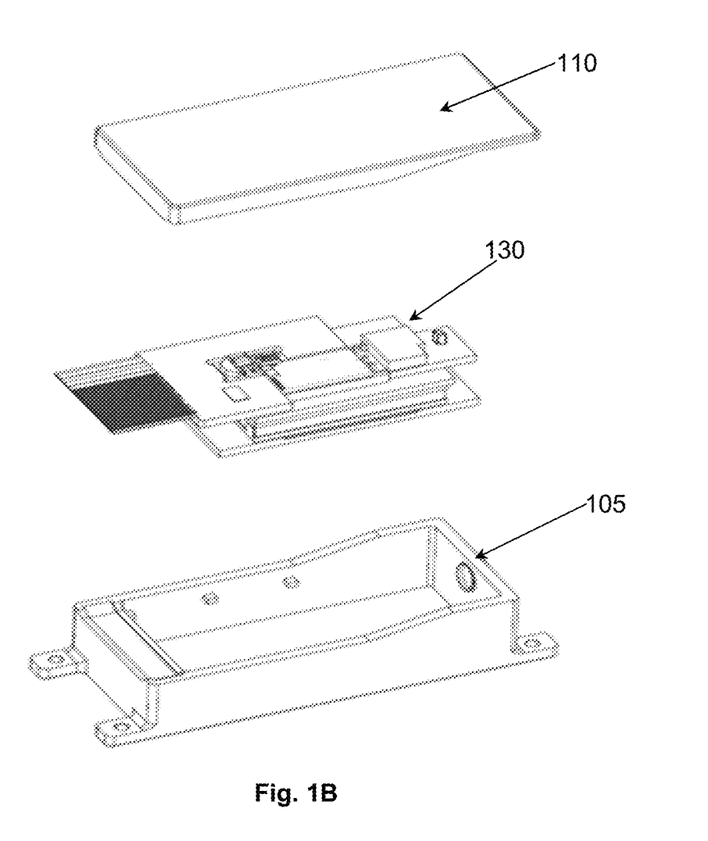
FIG. 1B is a pictorial snapshot illustrating an exploded view of components of the optical transceiver sub-assembly in accordance with an embodiment of the present invention.

FIG. 1A and FIG. 1B are pictorial snapshots illustrating an optical transceiver sub-assembly 100 in accordance with an embodiment of the present invention. In particular, the optical transceiver sub-assembly 100 is integrated with a silicon photonic platform having a folded optical path for transmitting and detecting optical signals. The optical transceiver sub-assembly 100 includes a housing chamber 105, a top cover 110 configured to engage with the housing chamber 105 and enclose other elements in the optical transceiver sub-assembly 100 other than the housing chamber 105 and the top cover 110; and a bottom housing module 115 accommodating an optical micro integration 130.

Figure 2A:
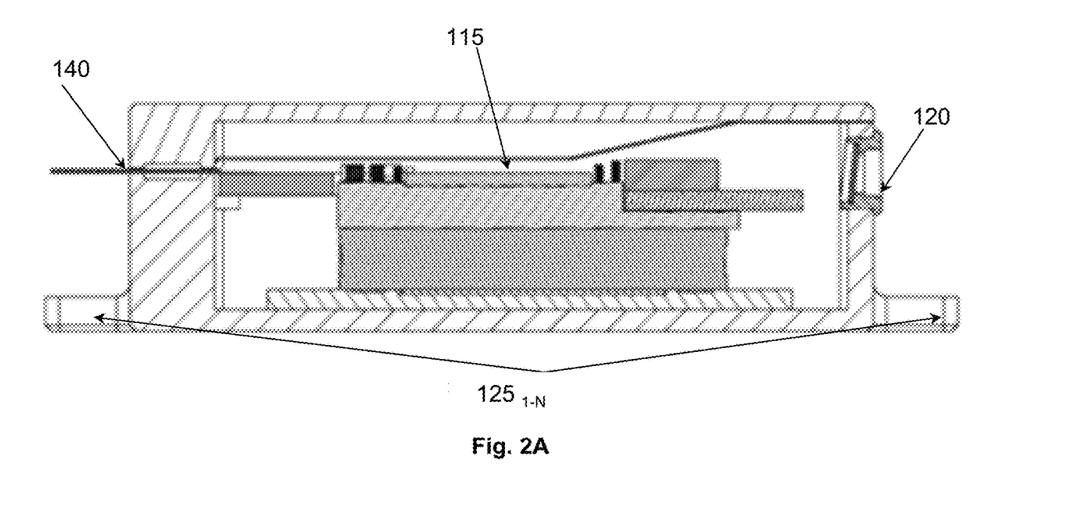
FIG. 2A is a pictorial snapshot illustrating a cross sectional view of the optical transceiver sub-assembly in accordance with an embodiment of the present invention.
Figure 2B:
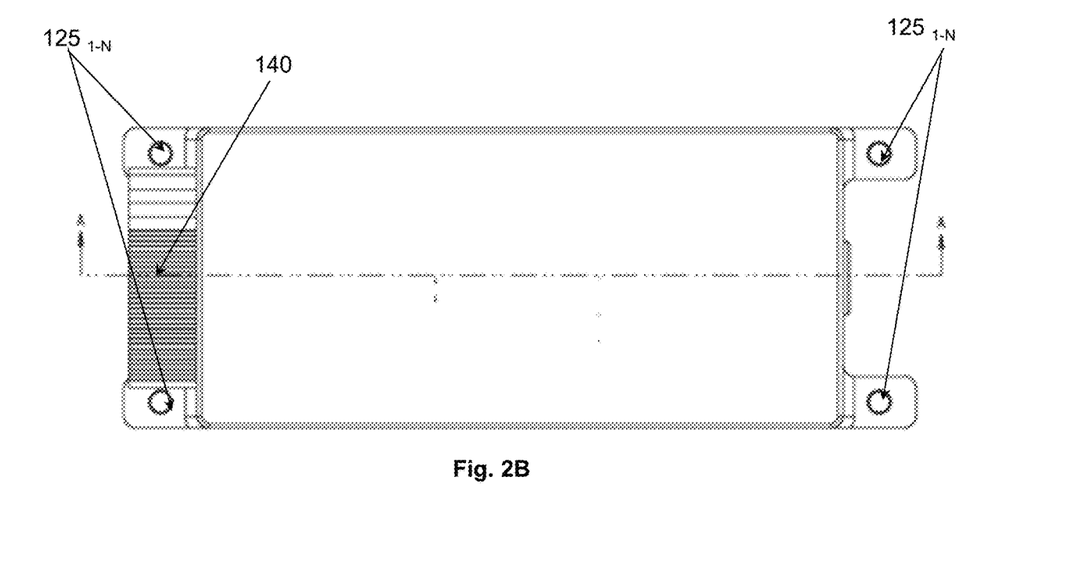
FIG. 2B is a pictorial snapshot illustrating a top view of the optical transceiver sub-assembly in accordance with an embodiment of the present invention.

FIG. 2A and FIG. 2B are pictorial snapshots illustrating cross-sectional view and top view of the optical transceiver sub-assembly 100 in accordance with an embodiment of the present invention. The optical transceiver sub-assembly 100 includes an electrical connection slot 140 and a transparent optical window 120 to establish electrical communication and optical communication with the outside surroundings and a plurality of mounting features $125_{1-N}$ at the bottom of the housing chamber 105 to fix the bottom housing module 115. Further, the flexible printed circuit board (PCB) 179 makes an electrical connection between Inner Printed circuit board (PCB) 175 and Outer Printed circuit board (PCB) 177 (will mention hereafter) through the electrical connection slot 140. The transparent optical window 120 makes an optical connection by its transparence to the light.

Figure 3:
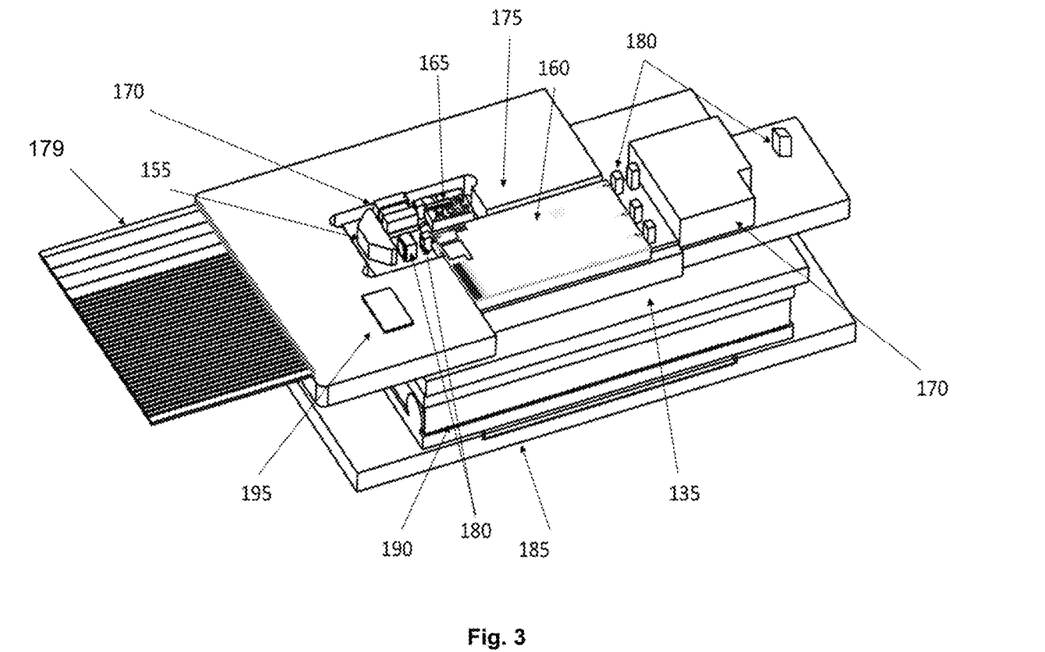
FIG. 3 is a pictorial snapshot illustrating a perspective view of the optical micro bench in accordance with an embodiment of the present invention.

FIG. 3 is a pictorial snapshot illustrating a perspective view of the optical micro integration 130 in accordance with an embodiment of the present invention. In particular, the optical micro integration 130 includes an optical micro bench 135 configured to deposit and carry a photonic integrated circuit (PIC) 160, a light source 165, a plurality of passive optical components 170 such as but is not limited to a lens 180 or a lens array, an isolator and an inner printed circuit board (PCB) 175. In particular, the optical micro bench 135 is made of material with good thermal conductivity and matched thermal expansion coefficient with silicon photonic integrated circuit (PIC). Moreover, the optical micro bench 135 has structure configuration for electrical and optical components height compensation.

Further, the optical micro integration 130 also includes a carrier 185 acting as a support to hold the optical micro integration 130 and a thermoelectric temperature controller (TEC) 190 for cooling heating elements in the optical transceiver sub-assembly. In particular, the optical micro integration 130 includes a prism 155 to fold light from the laser source/light source 165 in a reverse direction from original path.

In accordance with an embodiment of the present invention, the light source 165 is configured to emit an output light signal. In particular, the light source 165 is a laser source. Moreover, the laser source is positioned at one side of the photonic integrated circuit (PIC). Further, the laser source emits light in a reverse direction from the photonic integrated circuit (PIC).

The photonic integrated circuit (PIC) 160 manipulates the light beam to create optical signals and emit the optical signals to an output passive optical component 170 such as but not limited to a circulator and a polarizing beam splitter (PBS). The circulator distributes the received light beam to the "Rx" input of the photonic integrated circuit (PIC). Further, the polarizing beam splitter (PBS) allows light in one polarization (P) to pass unhindered while it reflects light.

The thermoelectric temperature controller (TEC) 190 is deposited on the carrier 185. In particular, the cooling surface of the thermoelectric temperature controller (TEC) 190 is placed towards the optical micro bench 135.

In accordance with an embodiment of the present invention, a flexible printed circuit board (PCB) 179 is configured to establish a signal connection between the inner printed circuit board (PCB) 175 on the optical micro bench 135 and the outer printed circuit board (PCB) 177 positioned on the bottom housing module 115. Further, the inner printed circuit board (PCB) 175 may accommodate a transimpedance amplifier and other electrical components to amplify the optical signals.

The inner printed circuit board (PCB) 175 acts as the routing path to make all the driving and sensing circuits reach the laser source and the photonic integrated circuit (PIC) 160. This configuration allows the integration to shrink its length and confine all the components on an area with length and width aspect ratio close to 1. Further, the configuration makes the thermoelectric temperature controller (TEC) 190 underneath function in the more efficient working range, and all the important electrical optical components can easily be enclosed in a hermetic cavity.

In accordance with an embodiment of the present invention, the inner printed circuit board (PCB) 175 may further include a Critical e-component 195 which may accommodate a transimpedance amplifier to convert current to voltage and Flexible printed circuit board 179 goes through the housing chamber 105 by epoxy slot to create mechanical sealed electrical communication.

Figure 4:
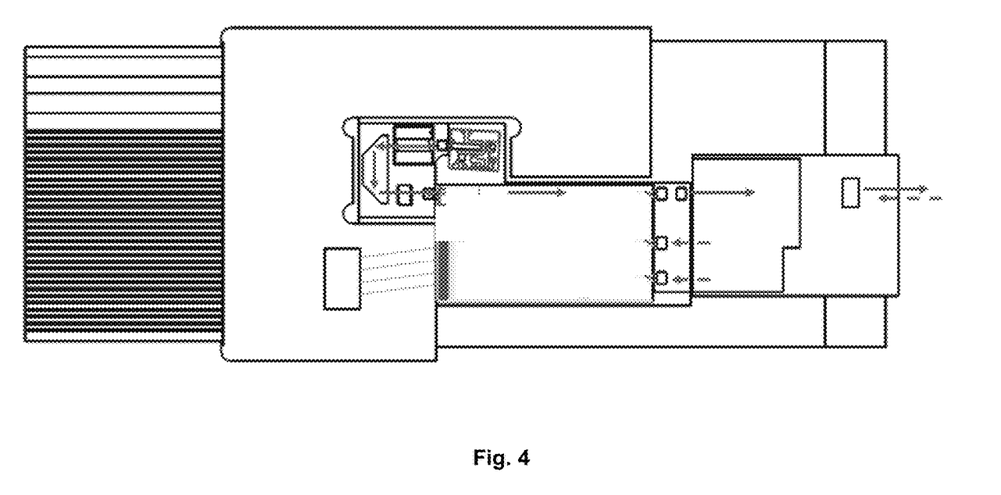
FIG. 4 is a pictorial snapshot illustrating the folded light path of the optical transceiver sub-assembly in accordance with an embodiment of the present invention.

FIG. 4 is a pictorial snapshot illustrating the folded light path of the optical transceiver sub-assembly 100 in accordance with an embodiment of the present invention. In particular, the folded light path makes the whole optical transceiver sub-assembly 100 more compact. The laser source is deposited at the one side of the photonic integrated circuit (PIC) 160 with the light emitting direction opposite to the photonic integrated circuit (PIC) transmitter direction. Further, the light beam folded by prism 155 and the passive optical components 170 is guided precisely to the input of photonic integrated circuit (PIC) 160. The photonic integrated circuit (PIC) 160 manipulates the light beam to create a certain optical signal and emit the optical signals to the output passive optical component such as but not limited to a circulator and a PBS.

The circulator distributes the received light beam to the Rx input of photonic integrated circuit (PIC) 160. And the optical signals are sensed and analyzed by PIC's sensing circuit. Electrical components such as but not limited to the transimpedance amplifier in the inner printed circuit board (PCB) 175 amplifies the optical signal to be analyzed.

Figure 5:
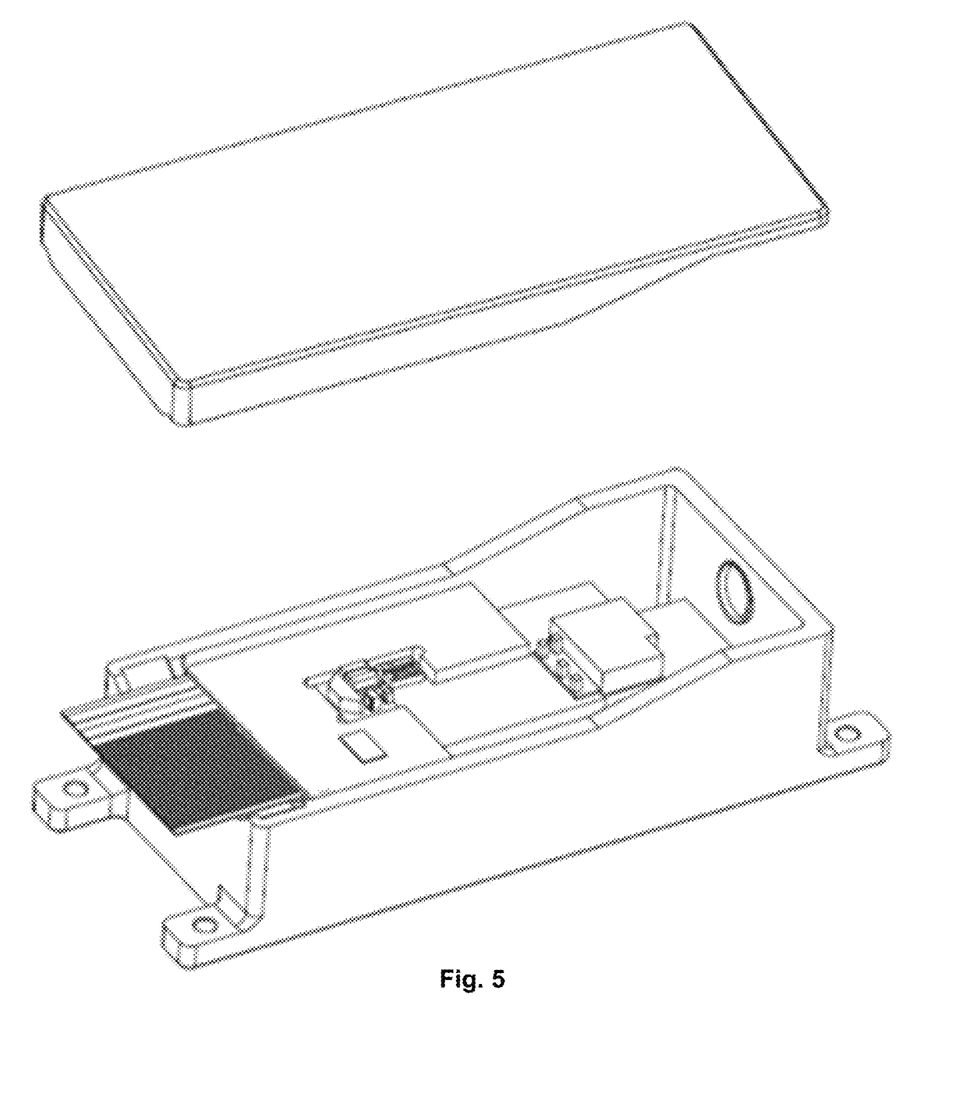
FIG. 5 is a pictorial snapshot illustrating the assembly process of the optical transceiver sub-assembly in accordance with an embodiment of the present invention.

FIG. 5 is a pictorial snapshot illustrating the assembly process of the optical transceiver sub-assembly in accordance with an embodiment of the present invention. The optical micro integration 130 is put inside the bottom of the housing chamber 105 and fixed by a soft epoxy using the soft fixing method. Although the large mechanical movement is constrained by the housing chamber 105, the optical micro bench 135 without solid fixing can have a tiny movement like floating in the chamber. Further, the configuration avoids the optical micro bench 135 to have any mechanical disturbances from outside and ensures the photonic integrated circuit (PIC) 160 and laser work in a stable environment and thus no internal stress in the photonic integrated circuit (PIC) is induced. After assembling the top cover 110 on the housing chamber 105, the optical transceiver sub-assembly 100 is hermetically packaged to protect the optical transceiver sub-assembly 100 from the humidity and dust. Further, the electrical optical connection is made by a flexible printed circuit board (PCB) 179 for electrical signals and the transparent optical window for light beam to establish communication with outside. The optical connection has a transparent optical window 120 for light only and the electrical connection slot 140 has a physical accommodation for the flexible printed circuit board (PCB) 179 to form the electrical connection and make the communication.

Figure 6:
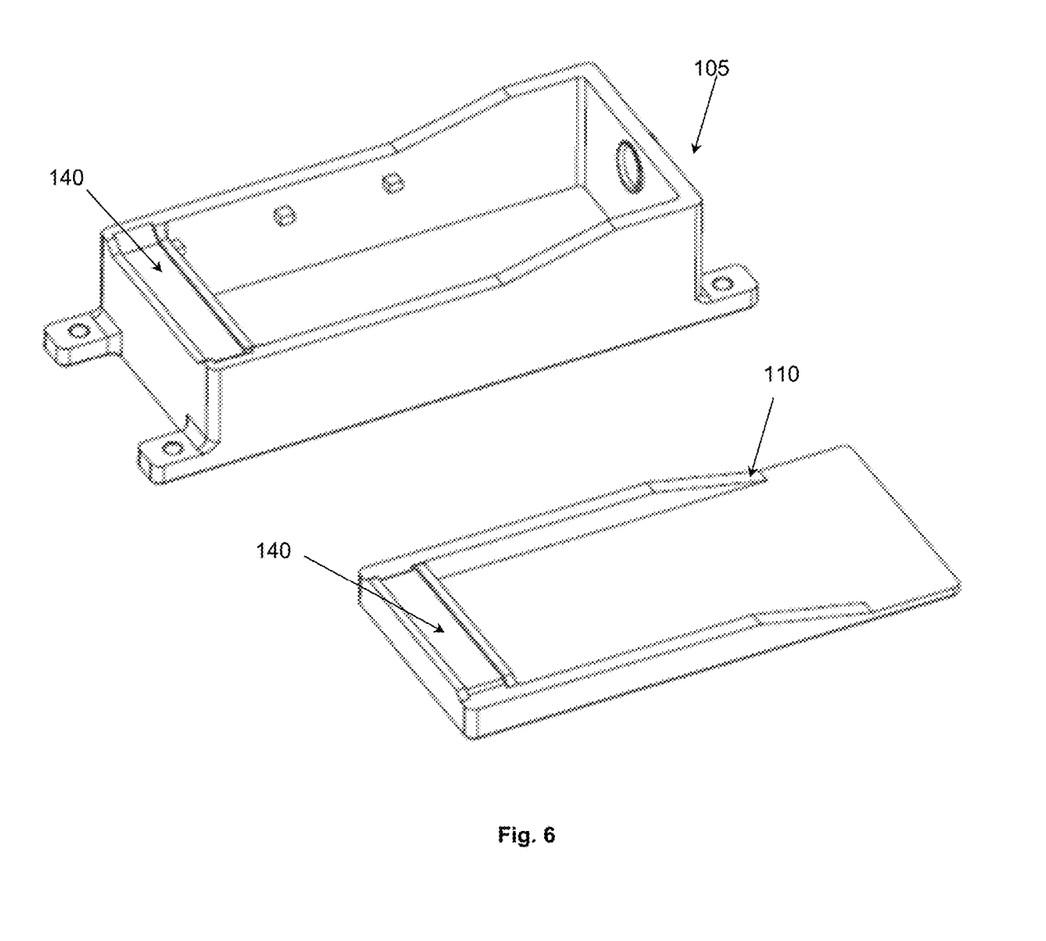
FIG. 6 is a pictorial snapshot illustrating slots on the housing chamber and the top cover of the optical transceiver sub-assembly in accordance with an embodiment of the present invention.

FIG. 6 is a pictorial snapshot illustrating slots on the housing chamber 105 and the top cover 110 of the optical transceiver sub-assembly 100 in accordance with an embodiment of the present invention. The electrical connection slots 140 on the housing chamber 105 and the top cover 110 of the optical transceiver sub-assembly 100 are for the electrical inlet and/electrical outlet. In particular, the flexible printed circuit board (PCB) 179 is used for signal connection between inner printed circuit board (PCB) 175 and outside printed circuit board (PCB) 177. Moreover, the flexible printed circuit board (PCB) 179 is clamped by the edge of the housing chamber and cover and the electrical connection slots 140 are filled with epoxy. The epoxy slots not only fix the flexible traces but also form the hermetic sealing after curing. Further, the slots 140 may control the amount of epoxy to be filled and form effective sealing.

Figure 7:
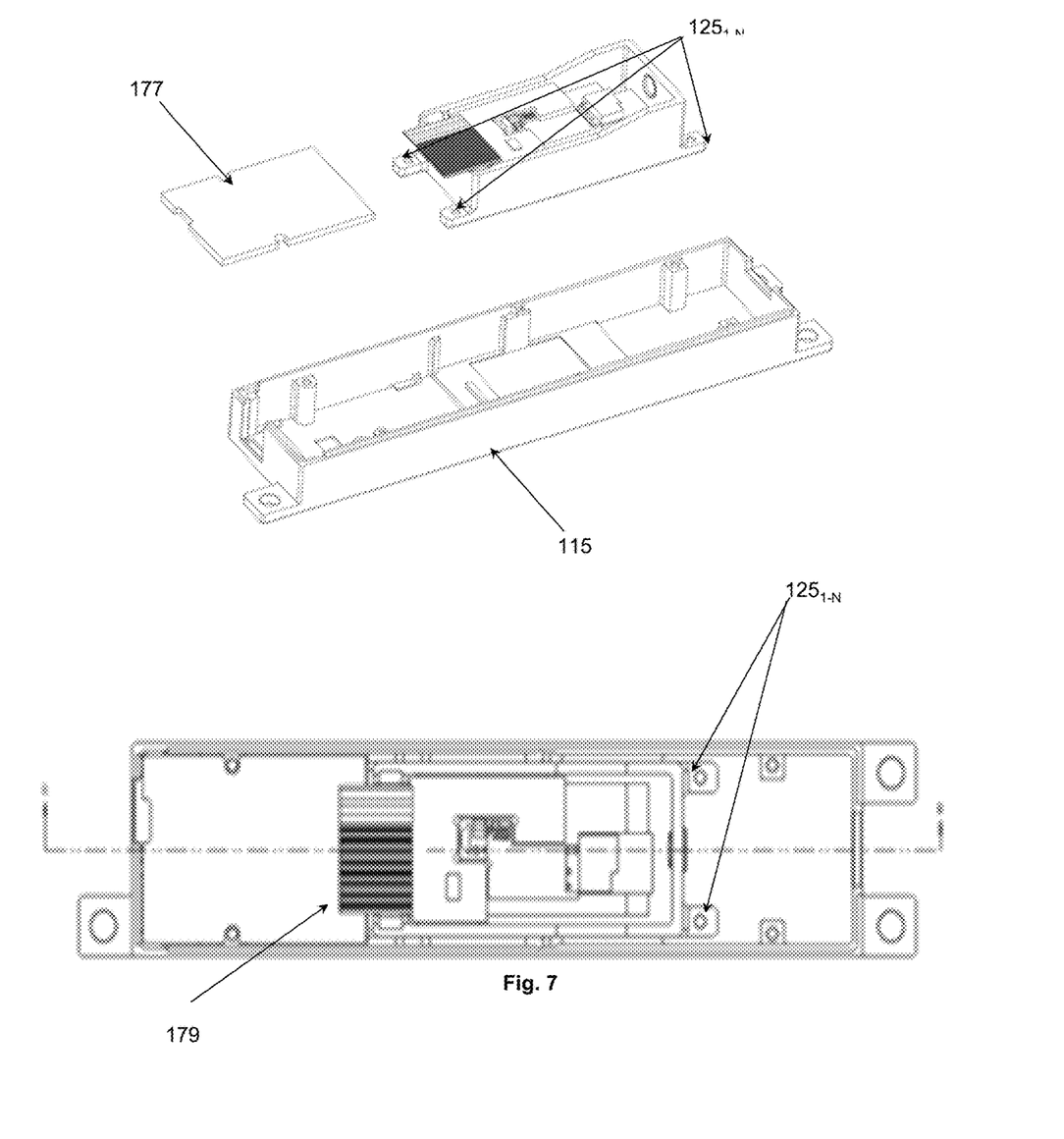
FIG. 7 is pictorial snapshot illustrating assembly of the optical transceiver sub-assembly into a transceiver module in accordance with an embodiment of the present invention.

FIG. 7 is a pictorial snapshot illustrating assembly of the optical transceiver sub-assembly 100 into a transceiver module in accordance with an embodiment of the present invention. The optical transceiver sub-assembly 100 is fixed to the bottom housing module 115 by the mounting features $125_{1-N}$ at four corners of the housing chamber 105. Further, the flexible PCB 179 connects the inner PCB 175 to the outer PCB 177 on the bottom housing module 115.

Figure 8:
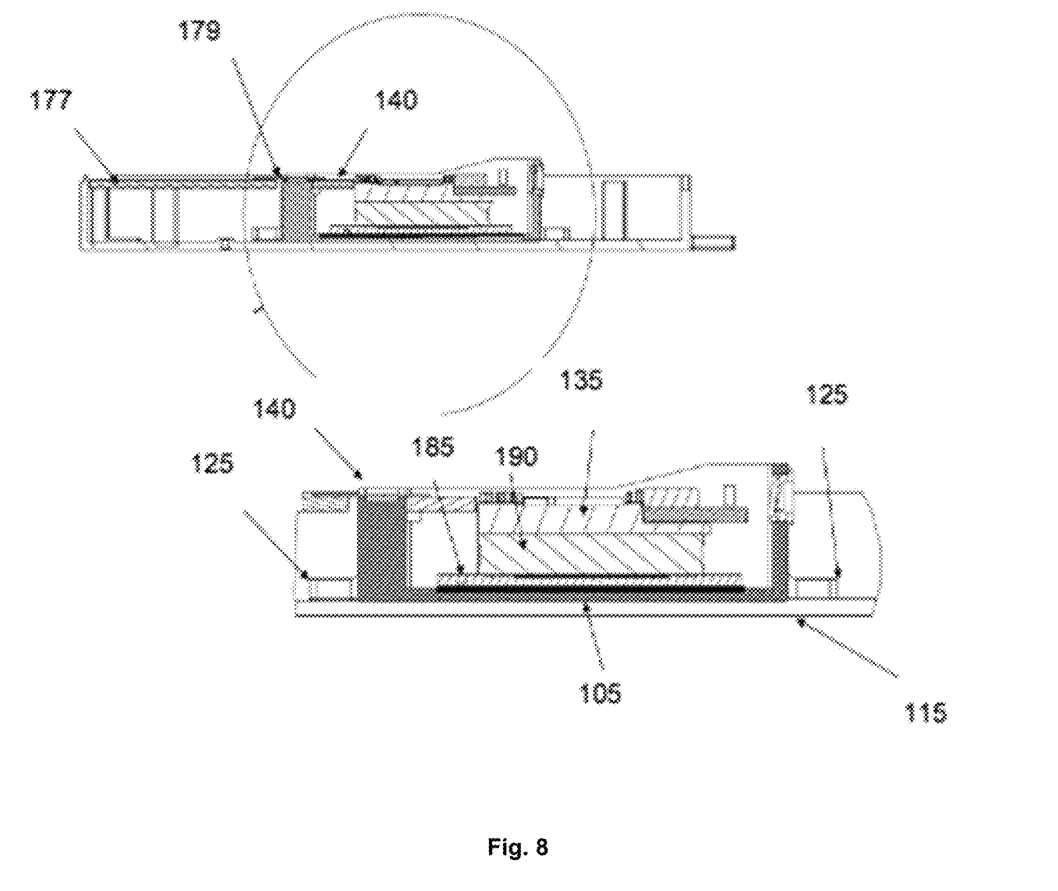
FIG. 8 is a pictorial snapshot illustrating cross section view of the optical transceiver sub-assembly into a transceiver module in accordance with an embodiment of the present invention.

FIG. 8 is a pictorial snapshot illustrating the cross-section view of the optical transceiver sub-assembly 100 into a transceiver module in accordance with an embodiment of the present invention. In particular, the carrier 185 is fixed to the housing chamber bottom by a soft fixing method. The housing chamber 105 is fixed by a hard method to the bottom housing module 115 by the mounting features $125_{1-N}$. Further, the flexible PCB 179 goes through the slot filled with epoxy to connect the outer PCB 177 and the inner PCB 175.

Figure 9:
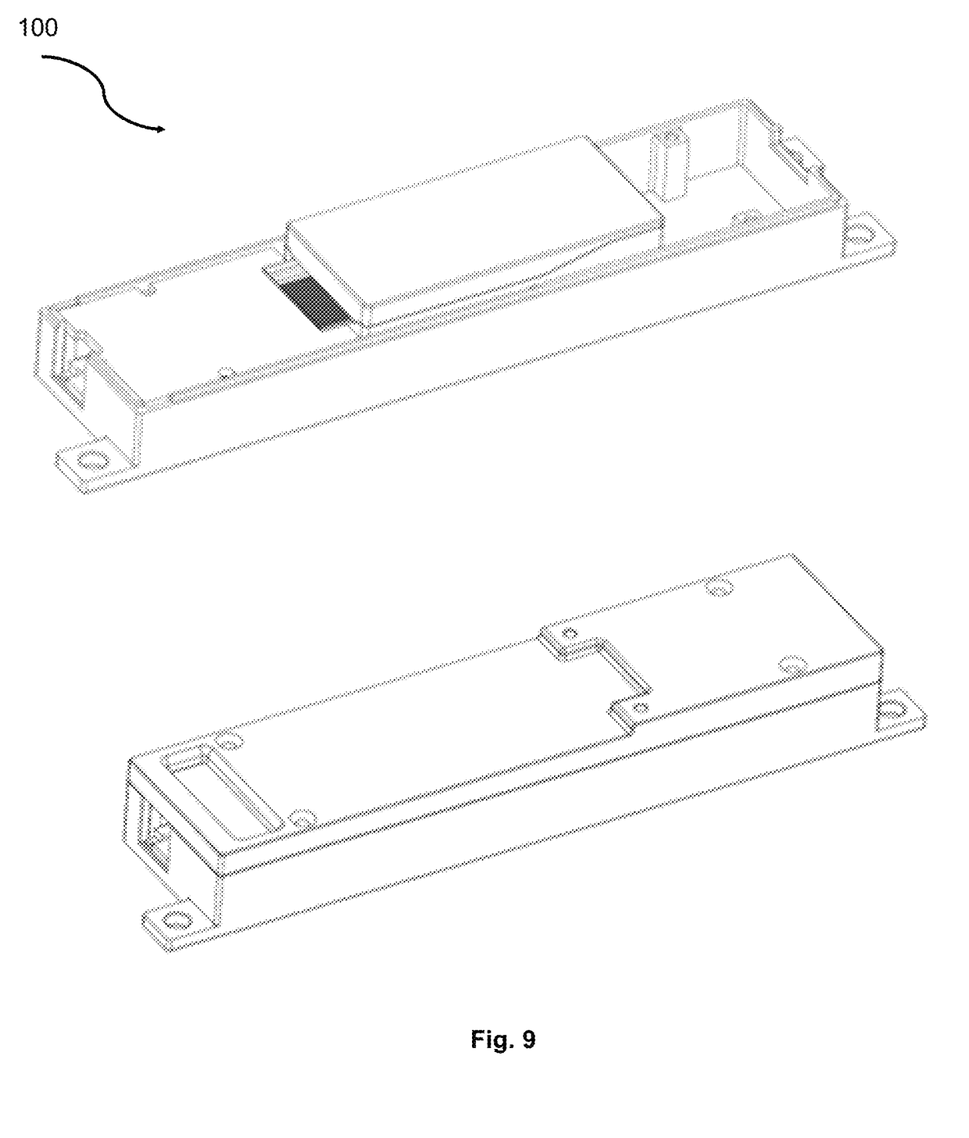
FIG. 9 is a pictorial snapshot illustrating the complete optical transceiver sub-assembly with the top housing assembled on the bottom housing module in accordance with an embodiment of the present invention.

FIG. 9 is a pictorial snapshot illustrating the optical transceiver sub-assembly 100 with the top cover 110 assembled on the bottom housing module 115 in accordance with an embodiment of the present invention.

Figure 10:
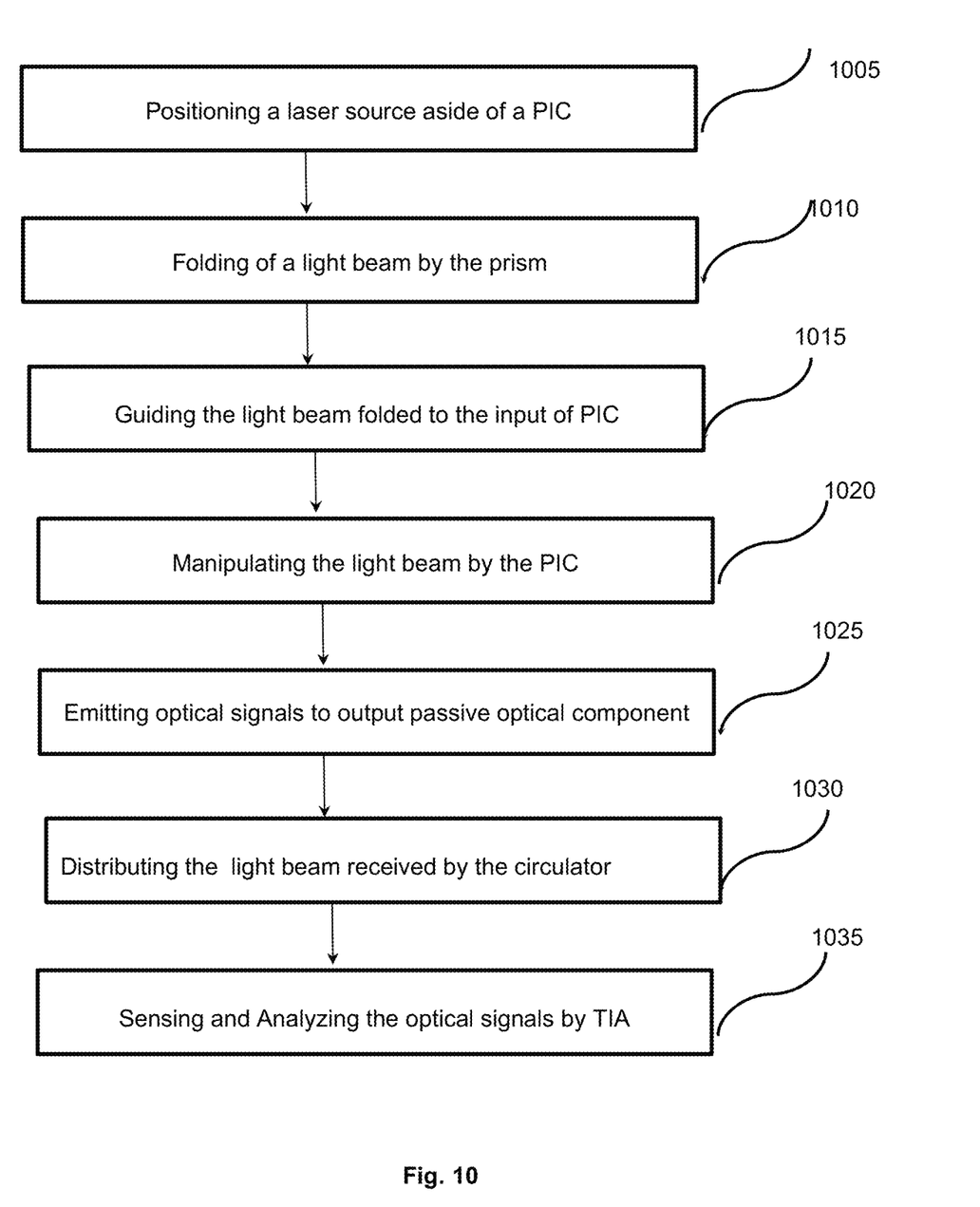
FIG. 10 is a flow chart illustrating a method for transmitting and detecting optical signals by an optical transceiver sub-assembly in accordance with an embodiment of the present invention.

FIG. 10 is a flow chart illustrating a method for transmitting and detecting optical signals by an optical transceiver sub-assembly in accordance with an embodiment of the present invention. The method starts at step 1005 and proceeds till step 1035.

At step 1005, the laser source is positioned at one side of a photonic integrated circuit (PIC) 160 on the optical micro bench 135. The laser source emits light in a reverse direction from the photonic integrated circuit (PIC) 160.

At step 1010, a light beam from the laser source is folded by a prism 155 in a reverse direction from the original path.

At step 1015, the light beam folded by the prism and a plurality of passive optical components 170 is guided to an input of the photonic integrated circuit (PIC) 160.

At step 1020, the light beam is manipulated by the photonic integrated circuit (PIC) 160 to form a plurality of optical signals.

At step 1025, the plurality of optical signals are emitted to an output passive optical component such as but not limited to a circulator and a PBS.

At step 1030, the light beam received by the circulator is distributed to "Rx" input of the photonic integrated circuit (PIC) 160.

At step 1035, the plurality of optical signals is sensed and analyzed by a transimpedance amplifier of an inner printed circuit board (PCB) 175.

In accordance with an embodiment of the present invention, the method includes depositing a photonic integrated circuit (PIC) 160, a light source 165, a plurality of passive optical components 170 and a printed circuit board (PCB) 175 on an optical micro bench 135 and soft fixing the optical micro integration 130 to the housing chamber 105 using a soft epoxy.

In accordance with an embodiment of the present invention, method further comprises clamping a flexible PCB 179 at an edge of the housing chamber 105 and the top cover 110, filling one or more slots 140 at electrical inlet and/or electrical outlet points on the housing chamber 105 and the top cover 110 with epoxy and curing one or more slots 140 to form a hermetic sealing to seal the optical transceiver sub-assembly 100.

Advantageously, the independent compact optical bench prevents environmental mechanical disturbances, making TEC work with good efficiency. The hermetic package with optical window ensures the integration and avoid dust and humidity from environment In view of the foregoing, it will now be appreciated that the elements of the block diagram and flowcharts support combinations of means for carrying out the specified functions and processes, combinations of steps for performing the specified functions and processes, program instruction means for performing the specified functions and processes, and so on.

The functions, systems and methods herein described could be utilized and presented in a multitude of languages. Individual systems may be presented in one or more languages and the language may be changed with ease at any point in the process or method described above. One of ordinary skills in the art would be to appreciate that there are numerous languages the system could be provided in, and embodiments of the present disclosure are contemplated for use with any language.

The invention is capable of myriad modifications in various obvious aspects, all without departing from the spirit and scope of the present disclosure. Accordingly, the drawings and descriptions are to be regarded as illustrative in nature and not restrictive.

The features described herein may be combined to form additional embodiments and sub-elements of certain embodiments may form yet further embodiments. The foregoing summary of the present disclosure with the preferred embodiment should not be construed to limit the scope of the invention. It should be understood and obvious to one skilled in the art that the embodiments of the invention thus described may be further modified without departing from the spirit and scope of the invention.

What is claimed is:

1. An optical transceiver sub-assembly integrated with a silicon photonic platform having a folded optical path for transmitting and detecting a plurality of optical signals, the sub-assembly comprising:
    a housing chamber;
    a top cover configured to engage with the housing chamber to enclose elements in the optical transceiver sub-assembly other than the housing chamber and the top cover;
    a bottom housing module accommodating an optical micro integration;
    a transparent optical window to establish an optical communication with outside surroundings;
    one or more slots are configured at electrical inlet and/or electrical outlet points on the housing chamber and the top cover; wherein the one or more slots are epoxy slots configured to hermetically seal the optical micro integration;
    a plurality of fixing features at a bottom of the housing chamber to fix the bottom housing module;
    a carrier configured to hold and provide support to the optical micro integration;
    a thermoelectric temperature controller (TEC) deposited on the carrier for cooling heating elements in the optical transceiver sub-assembly;
    the optical micro integration comprising:
        an optical micro bench configured to deposit a photonic integrated circuit (PIC), a light source, a plurality of passive optical components and an inner printed circuit board (PCB), wherein a cooling surface of the TEC is placed towards the optical micro bench;
        the light source emitting an output light signal and being a laser source;
        the PIC manipulating a light beam to form and emit the plurality of optical signals to one of the plurality of passive optical components as an output passive optical component; and
        a prism configured to fold the output light signal from the light source in a reverse direction from an original path;
    wherein the optical transceiver sub-assembly is operably configured to establish an optical-electrical communication with the outside surroundings.

2. The optical transceiver sub-assembly as claimed in claim 1, wherein the laser source is positioned at one side of the PIC.

3. The optical transceiver sub-assembly as claimed in claim 1, wherein the laser source emits light in a reverse direction from the PIC.

4. The optical transceiver sub-assembly as claimed in claim 1, wherein the housing chamber is secured with the bottom housing module (115) by a hard fixing method.

5. The optical transceiver sub-assembly as claimed in claim 1, wherein the carrier is secured to the housing chamber by a soft fixing method.

6. The optical transceiver sub-assembly as claimed in claim 1, wherein the optical micro integration is fixed to the housing chamber by a soft epoxy.

7. The optical transceiver sub-assembly as claimed in claim 1, wherein an electrical connection is made by a flexible PCB and the transparent optical window for light beam.

8. The optical transceiver sub-assembly as claimed in claim 1, wherein a thermal expansion coefficient of the optical micro bench and the PIC is similar.

9. The optical transceiver sub-assembly as claimed in claim 1, wherein the plurality of passive optical components include a lens or a lens array.

10. The optical transceiver sub-assembly as claimed in claim 1, wherein the output passive optical component includes a circulator and a polarizing beam splitter (PBS).

11. The optical transceiver sub-assembly as claimed in claim 1, wherein a flexible PCB is configured to establish a signal connection between the inner PCB on the optical micro bench and an outer PCB on the bottom housing module.

12. The optical transceiver sub-assembly as claimed in claim 1, wherein the inner PCB includes a transimpedance amplifier to sense and analyze the plurality of optical signals.

13. A method for transmitting and detecting an optical signal by an optical transceiver sub-assembly integrated with a silicon photonic platform having a folded optical path, wherein the method comprising steps of:

positioning a laser source aside of a photonic integrated circuit (PIC) on an optical micro bench, wherein the laser source emits light in a reverse direction from the photonic integrated circuit (PIC);

folding of a light beam from the laser source by a prism in a reverse direction from an original path;

guiding the light beam folded by the prism and a plurality of passive optical components to an input of the PIC;

manipulating the light beam by the PIC to form a plurality of optical signals;

emitting the plurality of optical signals to an output passive optical component;

distributing the light beam received by a circulator to "Rx" input of the PIC;

sensing and analyzing the plurality of optical signals by a transimpedance amplifier of an inner printed circuit board (PCB); and wherein the optical transceiver sub-assembly establishes an optical-electrical communication with outside.

14. The method as claimed in claim 13, wherein the method comprises:

depositing the PIC, a light source, a plurality of passive optical components and the inner PCB on an optical micro bench; and     soft fixing an optical micro integration to a housing chamber using a soft epoxy.

15. The method as claimed in claim 14, wherein the method further comprises:

clamping a flexible PCB at an edge of the housing chamber and a top cover;

filling one or more slots at electrical inlet and/or electrical outlet points on the housing chamber and the top cover with epoxy; and     curing one or more slots (140) to form a hermetic sealing to seal the optical transceiver sub-assembly.

16. The method as claimed in claim 14, wherein the method includes fixing the housing chamber to a bottom housing module by a hard fixing method.

17. The method as claimed in claim 13, wherein the plurality of passive optical components include a lens or a lens array and the output passive optical component includes a circulator and a polarizing beam splitter (PBS).

18. The method as claimed in claim 13, wherein a flexible PCB is configured to establish a signal connection between the inner PCB on a micro-optical bench and an outer PCB on a bottom housing module.

\* \* \* \* \*